United States Patent
Wu

(10) Patent No.: US 7,687,427 B2
(45) Date of Patent: Mar. 30, 2010

(54) SUPPORTED METAL ELECTROCATALYST MATERIALS AND THE METHOD FOR FORMING THE SAME

(75) Inventor: Mark Y. Wu, Arcadia, CA (US)

(73) Assignee: Enerage, Inc., Santa Clara, CA (US)

( * ) Notice: Subject to any disclaimer, the term of this patent is extended or adjusted under 35 U.S.C. 154(b) by 569 days.

(21) Appl. No.: 11/452,559

(22) Filed: Jun. 13, 2006

(65) Prior Publication Data

US 2006/0264325 A1    Nov. 23, 2006

Related U.S. Application Data

(60) Provisional application No. 60/690,330, filed on Jun. 13, 2005.

(51) Int. Cl.
| | |
|---|---|
| B01J 21/18 | (2006.01) |
| B01J 23/00 | (2006.01) |
| B01J 23/40 | (2006.01) |
| B01J 23/74 | (2006.01) |
| H01M 4/00 | (2006.01) |
| H01M 4/88 | (2006.01) |
| H01M 8/08 | (2006.01) |

(52) U.S. Cl. .................. 502/182; 502/101; 502/185; 429/40; 429/46

(58) Field of Classification Search .................. 502/101, 502/182, 185; 429/40, 46
See application file for complete search history.

(56) References Cited

U.S. PATENT DOCUMENTS

| | | | | |
|---|---|---|---|---|
| 3,573,122 A | * | 3/1971 | Olstowski et al. ......... 264/29.1 |
| 3,881,957 A | * | 5/1975 | Hausler ....................... 429/30 |
| 4,031,292 A | * | 6/1977 | Hervert ...................... 502/101 |
| 4,064,331 A | * | 12/1977 | Patton et al. ................ 429/221 |
| 4,136,059 A | * | 1/1979 | Jalan et al. .................. 502/101 |
| 4,656,153 A | * | 4/1987 | Wennerberg ................ 502/182 |
| 5,240,893 A | * | 8/1993 | Witherspoon ............... 502/101 |
| 5,501,915 A | * | 3/1996 | Hards et al. .................. 429/42 |
| 5,636,437 A | * | 6/1997 | Kaschmitter et al. .......... 29/825 |
| 5,698,483 A | * | 12/1997 | Ong et al. ..................... 501/12 |
| 5,876,867 A | * | 3/1999 | Itoh et al. ..................... 429/44 |
| 5,900,386 A | * | 5/1999 | Freund et al. ............... 502/330 |
| 6,518,218 B1 | * | 2/2003 | Sun et al. .................... 502/259 |
| 7,255,954 B2 | * | 8/2007 | Hampden-Smith et al. .... 429/40 |
| 2003/0198849 A1 | | 10/2003 | Hampden-Smith | |

FOREIGN PATENT DOCUMENTS

WO    WO 2004/036674 A2    4/2004

* cited by examiner

*Primary Examiner*—Patricia L Hailey
(74) *Attorney, Agent, or Firm*—K&L Gates LLP

(57) ABSTRACT

The present invention discloses a novel process for the fabrication of a class of conductive supported electrocatalysts based on transition metals. The electrocatalysts are formed by pyrolysis of an organometallic polymer complex precursor which is the reaction product of transition metal salts and a templating polymer. The electrocatalysts has enhanced catalytic activity, and are useful in the preparation of supercapacitor and fuel cell electrodes, auto-thermal fuel reformer catalysts, oxygen and hydrogen sensors, zinc-air battery electrode and oxidation catalysts.

19 Claims, 2 Drawing Sheets

SUPPORTED METAL ELECTROCATALYST MATERIALS AND THE METHOD FOR FORMING THE SAME

REALTED APPLICATIONS

This application claims the priority of Provisional Patent Application Ser. No. 60/690,330, filed on Jun. 13, 2005, the entire disclosure of which is expressly incorporated herein by reference.

FIELD OF THE INVENTION

The present invention relates to a method of producing high activity, supported, multi-metallic electrocatalysts with uniform composition and structural morphology and functionality.

BACKGROUND OF THE INVENTION

Nanostructured transition metal, alloy or composite are of technical importance as homogeneous or heterogeneous chemical catalysts. Nanocomposite comprises small particles typically having diameters less than 100 nm on the surface of a supported material for various chemical uses. Precious metal alloy nanocomposites are of special importance for their catalytic applications include photovoltaics, supercapacitors, batteries, fuel cells, and materials for hydrogen storage. Precious metals within the platinum group such as platinum, palladium, ruthenium and rhodium are well known for their catalytic capabilities in bulk and deposited phases. Such catalytic materials can be fabricated through bulk metal processes or through nanoparticle synthesis. Platinum group metals are very expensive metals and hence the catalysts are invariably expensive and are often designed to minimize the amount of metal used rather than to optimize performance. In addition, platinum group catalysts are prone to being "poisoned" in the presence of carbon monoxide and hence limit the application. Electrocatalyst made with cheaper and abundant transition metals that offer excellent performance will be desirable for industrial application.

Available preparation methods for catalytic transition metal alloy include sputtering, chemical reduction, inert gas evaporation, thermal decomposition and physical vapor deposition. These methods are complicated and demanding sophisticated instrumentation. In addition, they also suffer from contamination from mechanical parts, from reaction byproducts, agglomeration and difficulty in scalability.

For the fuel cell application, high-surface-area carbon blacks and often used to serve as effective solid supports to disperse nanoscale noble metal and to electrocatalyze oxidation and reduction reactions within the cells. Despite the high surface area of the conducting carbon support and effective dispersion of the electrocatalyst, self-agglomeration of the particle within the electrode structure limits the approach of the reactants to the active sites, and as a result, not all of the electrocatalyst in the electrode can be accessed.

Significant needs remain for synthesizing well-defined, non-agglomerated electrocatalyst of controlled size and composition.

SUMMARY

In view of the foregoing, this invention provides a method of making a supported, multi-metallic electrocatalysts with uniform composition, structural morphology and functionality. These electrocatalyst materials are formed by pyrolysis of an organometallic complex precursor which may be the reaction product of transition metal salts and a backbone polymer according to one embodiment of the present invention.

The electrocatalysts has enhanced catalytic activity, and are useful in the preparation of supercapacitor and fuel cell electrodes, auto-thermal fuel reformer catalysts, oxygen and hydrogen sensors, zinc-air battery electrode and oxidation catalysts.

According to another embodiment of the invention, a method is disclosed for making a metallic nanocomposite which comprises contacting metal ions with backbone polymer with at least one degradable ligand to form the precursor, wherein the degradation temperature of the ligand is below 1000° C. The precursor is heated in a controlled atmosphere environment to degrade at least one ligand and form the composite.

The construction and method of operation of the invention, however, together with additional objects and advantages thereof will be best understood from the following description of specific embodiments when read in connection with the accompanying drawings.

BRIEF DESCRIPTION OF THE DRAWINGS

The invention will now be described in detail with respect to preferred embodiments with reference to the accompanying drawings, wherein.

DETAILED DESCRIPTION OF THE PREFERRED EMBODIMENTS

The construction and method of operation of the invention, however, together with additional objects and advantages thereof will be best understood from the following descriptions of specific embodiments when read in connection with the accompanying figures.

Figure 1:
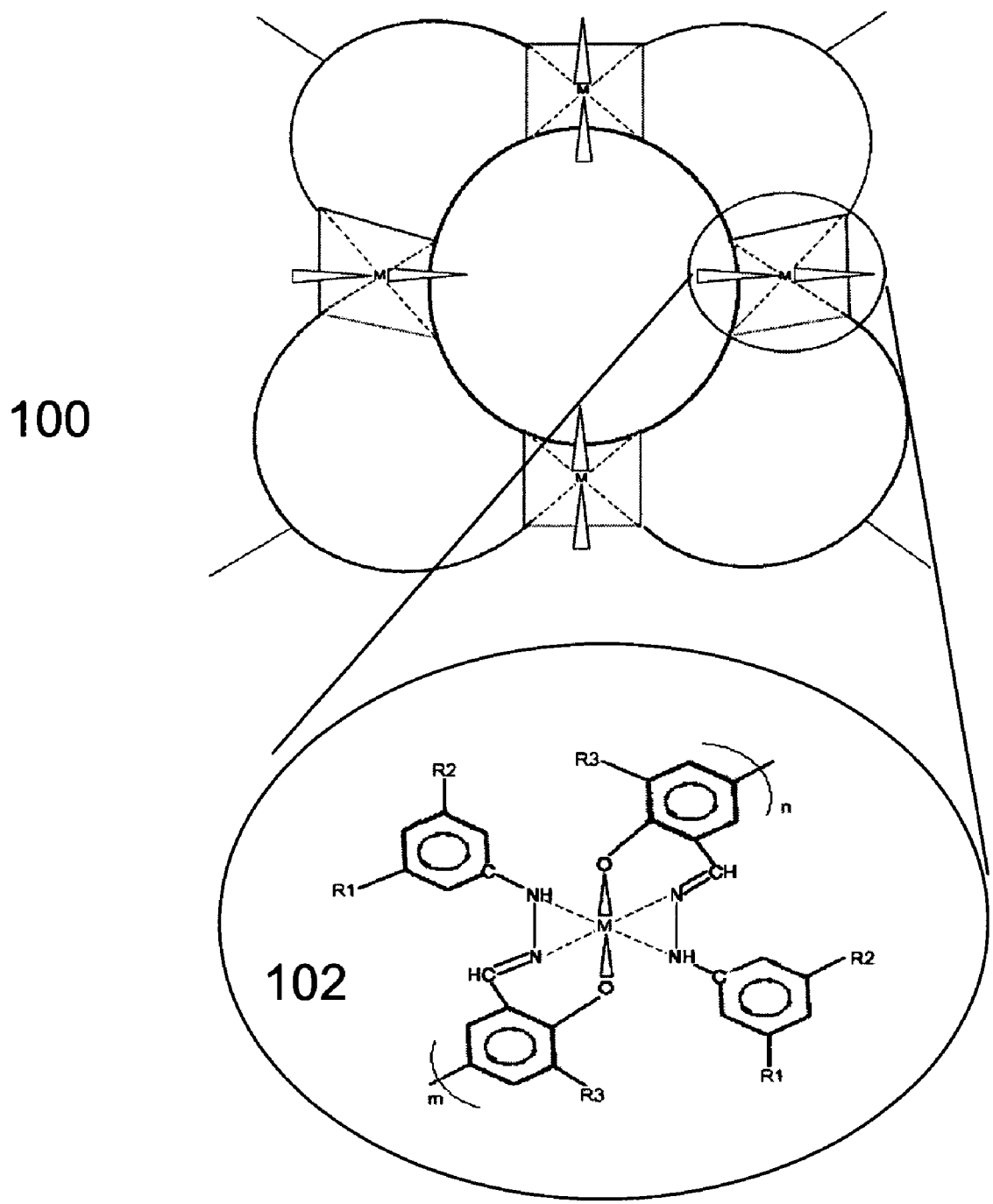
FIG. 1 presents a diagram showing the templating polymer with multiple coordination sites.

FIG. 1 is a diagram showing the templating polymer 100 with multiple coordination sites. M denotes for transition metal ion. Useful transition metal salts group includes carboxylates, halides, alcoholates, formate, sulfates, oxalates, carbonates and bicarbonates of tin, nickel, copper, tungsten, chromium, iron, cobalt, molybdenum, manganese, bismuth, cerium or titanium. The backbone polymer according to the invention comprises thermal setting backbone polymer with multiple active coordination sites. The thermal setting backbone polymer can be chosen among phenolic, urea-formaldehyde, melamine-formaldehyde, epoxy resins and their substituted derivative thereof.

The coordination ligand of the backbone polymer according to the invention may be selected from numerous elements or groups so long as they are thermally degradable and having a degradation temperature lower than 1000° C. Organic ligand or substituted organic ligands such as alkyl, alkenyl, aryl, aralkyl, alkylphosphino, alkylsulfido, and other groups such as carbon monoxide, ammonia, amine, alkene, heteroatomic aromatic molecules and derivative, and substituted and unsubstituted versions of the compounds and molecules.

In one preferred embodiment, the precursor is thermally degradable, including bridging and non-bridging ligands, with the exception of the core metals, which would be the alloy phase of a nanocomposite formed from the precursor. FIG. 1 depicts one preferred precursor structure 102 with metal ion coordinate with the backbone thermal setting polymer. Polymer with suitable coordination site of hydroxyl, ether, amine, hydrazono functional group are most preferred. These polymer can be formed by condensation polymerization of a phenol, substituted phenol, or di-substituted phenol with formaldehyde in the presence of either basic or acidic catalyst at temperature sufficient to form the intended condensation compound. R1, R2 and R3 each indepently represent a preferentially electron-withdrawing group selected among halogen, acyl, ester, carboxylic acid, nitro, nitrile or branched aryl groups having halogen or jointed to each other. As one in the art can realize looking at the above figure, the precursor according to the invention has available both nitrogen and oxygen for chelating metal centers. Metal centers can be single or multiple transition metal ions chosen to coordinate with the backbone polymer in order to achieve different catalytic activity.

In a currently preferred embodiment within the scope of the present invention, catalysts typically contain multiple metal ions chosen from group IB-VIIIB out of periodic table. The backbone polymers are preferably thermal setting polymer to minimize diffusion and thereby prevent particle growth. For the reaction between metal ions and backbone polymers, at least two ways can be implemented: (1) make the metal ion solution with selected atomic ratio that is approximately equal to a stoichiometric ratio in the absence of support and then deposit it on the support or (2) make it in the presence of the support such that the support aids in minimizing particle growth. A supported nanocomposite electrocatalyst is formed by thermal treatment to a temperature preferably below 1000° C. to initiate degradation of the organic backbone while the selected metal atomic ratio remained.

In various embodiments within the scope of the present invention, the electrocatalysts typically contain multiple metal ions chosen from group IB-VIIIB out of periodic table. The backbone polymers are preferably thermal setting polymer to minimize diffusion and thereby prevent particle growth. For the reaction between metal ions and backbone polymers, at least two ways can be implemented: (1) making the metal ion solution with selected atomic ratio that is approximately equal to a stoichiometric ratio in the absence of support and then deposit it on the support or (2) making it in the presence of the support such that the support aids in minimizing particle growth. A supported nanocomposite electrocatalyst is then formed by thermal treatment to initiate degradation of the organic backbone polymer while the selected metal atomic ratio remain.

Figure 2:
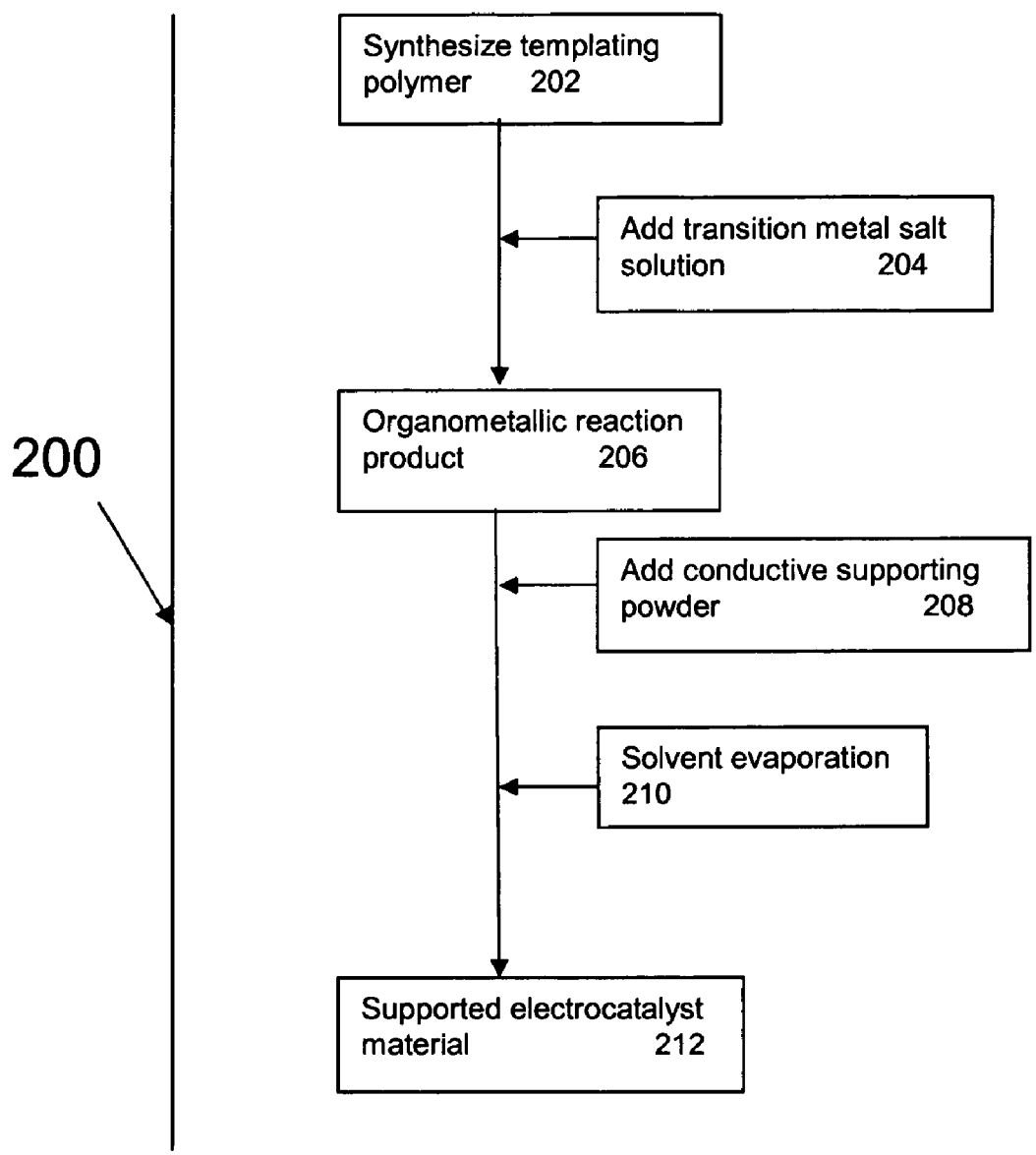
FIG. 2 is a diagram of a flow chart showing the procedure for making a predetermined catalyst that is used in accordance with the embodiments of the present invention.

FIG. 2 is a flow diagram illustrating a general process 200 in accordance with embodiments of the present invention that can be used to prepare the electrocatalyst. The process begins with a step 202 synthesizing the backbone polymer with various coordination sites. Single or multiple transition metal salts are then added in step 204 to react with the polymer to form organometallic complex in step 206. Conducting support, like carbon in a particulate form having a mean particle diameter less than or equal to about 30 nanometers or surface area of at least 250 m2/g, is then added or mixed with the precursor complex in step 208. A solvent evaporation is then performed in step 210. The precursor contacted support is preferably heated to a temperature equal to or less than about 1000° C. in order to thermally degrade the backbone polymer to obtain the supported electrocatalyst material in step 212. The preferred heating temperature will depend, to a large degree, on the particular thermally degradable ligands used and the degradation temperature of the core metals and any other desired groups which are to remain in the nano-structure. However, the heating temperature is at least 300° C., and more preferably at least 600° C. The heating procedure is conducted in the substantial absence of an oxidizing agent in the above described embodiments of the invention. The most preferred heating environment is 10 volume percent of hydrogen and 90 volume percent of argon. The generated electrocatalyst can be activated by a reduction in hydrogen atmosphere in application.

The process for forming the electrocatalyst materials are explained in further details according to one embodiment of the present invention:

STEP 1—Preparation of Backbone Polymer:

15 g of 2,4-dinitrophenylhydrazine is added in a suspension of 20 g of 4-formyl-benzene-1,3-diol in 250 ml of water. After stirring at room temperature for 30 minutes, 15 g of 3,5-dimethyl phenol, 2 g of KOH and 20 ml of formaldehyde (35 wt. %) were added into the solution. The resulting suspension is refluxed for 8 hours with vigorous stirring to obtain dark red solid. The resulting suspension was then neutralized to pH 7 with 1 M HCl solution. The solid part was collected and washed first with water and then with cold water/acetone (70:30 v/v) solution to remove un-reacted components. After filtering and drying under vacuum for 4 hours, 12 g backbone polymer was obtained.

Characterization of the polymer obtained using Fourier transformed Infrared Spectroscopy resulting: 3600-3200 cm-1(v O—H); 3290 cm-1 (vN-H); 3100 cm-1 (v aromatic C—H); 1615 cm-1 (v aromatic C=C); 1590 cm-1 (δN—H); 1530,1514 cm-1 (v NO2); 1330 cm-1 (δO—H); 830 cm-1 (v aromatic C—NO2).

STEP 2—Preparation of Supported Organometallic Precursor:

3 g of backbone polymer was dissolved in 120 ml of acetone at room temperature. To the polymer acetone solution, 2 g of nickel sulfate was added with stirring. After all the solids were dissolved into a homogeneous solution, 5 g of carbon black was added and continued to stir at room temperature for another 1 hour. A black solid powder was obtained after all the acetone solvent was evaporated.

STEP 3—Heat Treating the Supported Organometallic Precursor:

The above black solid powder is introduced into a quartz crucible and is transferred into a controlled atmosphere tube furnace. The heat treating process was conducted at 600° C. with (10° C./min) ramp rate under continuous flow of argon for 3 hours. 5.5 g of non-activated supported electrocatalyst material was obtained.

STEP 4—Catalyst Activation:

The above electrocatalyst material can be activated and ready for application by reduction of the metal active sites under flow of mixture of 10 volume percent of hydrogen and 90 volume percent of argon at 550° C. for 2 hours in controlled atmosphere tube furnace.

This invention provides many different embodiments, or examples, for implementing different features of the invention. Specific examples of components and processes are described to help clarify the disclosure. These are, of course, merely examples and are not intended to limit the disclosure from that described in the claims. Although illustrative embodiments of this invention have been shown and described, other modifications, changes, and substitutions are intended. Accordingly, it is appropriate that the appended claims be construed broadly and in a manner consistent with the scope of the disclosure, as set forth in the following claims.

What is claimed is:

1. A method for forming a supported electrocatalyst, comprising:
   synthesizing a backbone polymer with one or more coordination sites;
   forming a predetermined organometallic precursor complex by adding one or more transition metal salts to react with the synthesized backbone polymer;
   adding a predetermined conducting support including a carbon in a particulate form to the formed precursor complex;
   generating the supported electrocatalyst by degrading the backbone polymer of the precursor complex by heating the precursor complex to a temperature equal to or less than 1000° C., wherein the heating includes determining a heating temperature based on thermally degradable ligands used and a degradation temperature of one or more core metals and one or more predetermined element groups that are expected to remain in the electrocatalyst; and
   activating the supported electrocatalyst in a composite gas ambient of hydrogen and argon at a temperature less than 600° C.

2. The method of claim 1, wherein the backbone polymer is chosen from the group consisting of phenolic, urea-formaldehyde, melamine-formaldehyde, epoxy resins and their substituted derivative thereof.

3. The method of claim 1, wherein the carbon in a particulate form has a mean particle diameter less than or equal to about 30 nanometers.

4. The method of claim 1, wherein the conducting support has a surface area of at least 250 $m^2/g$.

5. The method of claim 1, wherein the heating temperature is between 300° C. and 600° C.

6. The method of claim 1, wherein the heating is conducted in a substantial absence of an oxidizing agent.

7. The method of claim 1, wherein the transition metal salts are selected from a group consisting of carboxylates, halides, sulfates, alcoholates, formate, oxalates, carbonates and bicarbonates of tin, nickel, copper, tungsten, chromium, iron, cobalt, molybdenum, manganese, bismuth, cerium or titanium.

8. A method for forming a supported electrocatalyst comprising:
   synthesizing a backbone polymer with one or more coordination sites;
   forming a predetermined organometallic precursor complex by adding one or more transition metal salts to react with the synthesized backbone polymer;
   adding a predetermined conducting support including a carbon in a particulate form to the formed precursor complex;
   generating the supported electrocatalyst by degrading the backbone polymer of the precursor complex by heating the precursor complex at a temperature equal to or less than 1000° C., wherein the backbone polymer is chosen from the group consisting of phenolic, urea-formaldehyde, melamine-formaldehyde, epoxy resins and their substituted derivative thereof; and
   activating the supported electrocatalyst in a composite gas ambient of hydrogen and argon at a temperature less than 600° C.,
   wherein the heating includes determining a heating temperature based on one or more thermally degradable ligands used and a degradation temperature of one or more core metals and one or more predetermined element groups that are expected to remain in the electrocatalyst.

9. The method of claim 8, wherein the carbon in a particulate form has a mean particle diameter less than or equal to about 30 nanometers.

10. The method of claim 8, wherein the conducting support has a surface area of at least 250 $m^2/g$.

11. The method of claim 8, wherein the heating temperature is between 300° C. and 600° C.

12. The method of claim 8, wherein the heating is conducted in a substantial absence of an oxidizing agent.

13. The method of claim 8, wherein the composite gas ambient further comprises 10 volume percent of hydrogen and 90 volume percent of argon.

14. The method of claim 8, wherein the transition metal salts are selected from a group consisting of carboxylates, halides, sulfates, alcoholates, formate, oxalates, carbonates and bicarbonates of tin, nickel, copper, tungsten, chromium, iron, cobalt, molybdenum, manganese, bismuth, cerium or titanium.

15. The method of claim 8, wherein the backbone polymer includes a thermal setting backbone polymer with multiple active coordination sites.

16. The method of claim 8, wherein the heating is conducted in an argon ambient.

17. The method of claim 8, wherein the activating is conducted in an environment with 10 volume percent of hydrogen and 90 volume percent of argon.

18. The method of claim 8, wherein the transition metal salts is chosen from the group consisting of: carboxylates, halides, sulphates, alcoholates, formate, oxalates, carbonates and bicarbonates of tin, nickel, chromium, copper, tungsten, iron, cobalt, molybdenum, manganese, bismuth, cerium and titanium.

19. The method of claim 8, wherein the backbone polymer comprises thermal setting backbone polymer.

* * * * *